United States Patent
May

(10) Patent No.: US 7,888,408 B2
(45) Date of Patent: Feb. 15, 2011

(54) TREATED INORGANIC METAL CONTAINING POWDERS AND POLYMER FILMS CONTAINING THEM

(75) Inventor: Donald Douglas May, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 740 days.

(21) Appl. No.: 11/885,920

(22) PCT Filed: Mar. 16, 2006

(86) PCT No.: PCT/US2006/011336

§ 371 (c)(1),
(2), (4) Date: Sep. 7, 2007

(87) PCT Pub. No.: WO2006/118715

PCT Pub. Date: Nov. 9, 2006

(65) Prior Publication Data

US 2008/0171818 A1 Jul. 17, 2008

Related U.S. Application Data

(60) Provisional application No. 60/662,533, filed on Mar. 16, 2005.

(51) Int. Cl.
C08K 9/00 (2006.01)
(52) U.S. Cl. .................. 523/205; 106/447; 106/471; 106/491; 523/210; 523/216
(58) Field of Classification Search ................. 523/205, 523/210, 216; 106/447, 471, 491
See application file for complete search history.

(56) References Cited

U.S. PATENT DOCUMENTS

| | | |
|---|---|---|
| 3,124,605 A | 3/1964 | Wagner |
| 4,350,645 A | 9/1982 | Kurosaki et al. |
| 4,430,001 A | 2/1984 | Schurr |
| 4,600,441 A | 7/1986 | Goldberg et al. |
| 5,288,320 A | 2/1994 | Decelles |
| 5,397,391 A | 3/1995 | Stramel |
| 5,560,845 A | 10/1996 | Birmingham, Jr. et al. |
| 5,827,919 A | 10/1998 | May |
| 5,837,049 A | 11/1998 | Watson et al. |
| 5,847,134 A | 12/1998 | May |
| 5,910,535 A | 6/1999 | Smith |
| 5,948,851 A | 9/1999 | Anton et al. |
| 6,436,478 B2 | 8/2002 | O'Neil |
| 6,492,463 B1 | 12/2002 | Waggoner |
| 6,646,037 B1 | 11/2003 | El-Shoubary et al. |
| 6,713,543 B2 | 3/2004 | El-Shoubary et al. |
| 6,800,354 B2 | 10/2004 | Baumann et al. |
| 6,894,089 B2 | 5/2005 | Mei et al. |
| 2003/0051635 A1 | 3/2003 | Subramanian et al. |
| 2004/0127393 A1 | 7/2004 | Valpey, III et al. |

FOREIGN PATENT DOCUMENTS

| | | |
|---|---|---|
| JP | 10-219461 | 8/1998 |
| WO | WO 97/07879 | 3/1997 |

OTHER PUBLICATIONS

Karrer, Organic Chemistry (English translation published by Elsevier), 1938, p. 135.
Pawlenko, "Organosilicon Compounds", G. Thieme Verlag, New York, 1980.
Alder et al., "The Alkyl Esters of Phosphoric Acid", Chemical Industries, 51, 1942, pp. 516-522.
PCT International Search Report and Written Opinion for International Application No. PCT/US06/11336 dated Apr. 3, 2007.

*Primary Examiner*—Edward J Cain

(57) ABSTRACT

A treated pigment comprising: (a) an inorganic pigment; (b) an organic compound comprises a fluoroalkyl group and a hydrocarbon group and having the structure: $R_H$-L-$R_F$, wherein $R_F$ is a fluorochemical component containing at least one Zerewitinoff hydrogen; $R_H$ is an aliphatic group of 1-30 carbons, cycloaliphatic group of 3-30 carbons, an aromatic group of 6-30 carbons, or a group having the structure: R'—$(OCH_2CHR'')_{x'}$—$(OCH_2CH_2)_{y'}$—O—, wherein R' is H or an aliphatic group of 1-20 carbons, R" is H or methyl; and x' and y' are the same or different integers ranging from 0-20 except that the sum of x' and y' is at least 1 when R' is H; and L is selected from the group CO, isocyanate, and a mixture of polyisocyanates containing at least three isocyanate groups per $R_H$-L-$R_F$ structure. Plastic articles containing a pigment and the organic compound have improved cleanability with all the other needed properties and without the negative property of chaulking.

29 Claims, No Drawings

TREATED INORGANIC METAL CONTAINING POWDERS AND POLYMER FILMS CONTAINING THEM

CROSS-REFERENCE TO RELATED APPLICATION

This application claims the benefit of U.S. Provisional Application No. 60/662,533, filed Mar. 16, 2005 which is incorporated by reference in its entirety.

BACKGROUND OF THE INVENTION

1. Field of the Invention

The present disclosure relates to inorganic pigments, more particularly treated titanium dioxide, and a process for their preparation and their use in polymer compositions and polymer compositions having easy cleanability.

2. Description of the Related Art

High molecular weight polymers, for example, hydrocarbon polymers and polyamides, are melt extruded into shaped structures such as tubing, pipe, wire coating or film by well-known procedures wherein a rotating screw pushes a viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die the tube is continuously inflated by air, cooled, collapsed by rolls and wound up on subsequent rolls.

Inorganic pigments are added to the polymers. In particular, titanium dioxide pigments are added to polymers for imparting whiteness and/or opacity to the finished article. To deliver other properties to the molded part or film, additional additives are incorporated into the processing step. What is needed is a titanium dioxide that has multiple properties associated with it.

One of these properties is cleanability. One common way to impart cleanability to plastic articles is to incorporate a titanium dioxide pigment that causes the plastic article to be broken down by sunlight. The surface of the article is then renewed by washing of the article, for example, with rain. This process is called chaulking but suffers from the problem that the article is slowly eroded away.

What is needed is a pigmented plastic article having easy cleanability without the negative property of chaulking.

SUMMARY OF THE INVENTION

In a first aspect, the disclosure provides a treated pigment comprising:

(a) an inorganic pigment; and (b) an organic compound comprising a fluoroalkyl group and a hydrocarbon group and having the structure:

$$R_H\text{-L-}R_F$$

wherein $R_F$ is a fluorochemical component containing at least one Zerewitinoff hydrogen;

$R_H$ is selected from the group of an aliphatic group of 1-30 carbons, cycloaliphatic group of 3-30 carbons, an aromatic group of 6-30 carbons, and a group having the structure: R'—(OCH$_2$CHR")$_{x'}$—(OCH$_2$CH$_2$)$_{y'}$—O—, wherein R' is H or an aliphatic group of 1-20 carbons, R" is H or methyl; and x' and y' are the same or different integers ranging from 0-20 except that the sum of x' and y' is not 0 when R' is H, preferably x' is 0 and y ranges from 3 to 10, and mixtures thereof; and L is selected from the group CO, isocyanate, and a mixture of polyisocyanates containing at least three, typically 3 to 8, isocyanate groups per $R_H$-L-$R_F$ structure.

In the first aspect, the inorganic pigment is an oxide, mixed oxide, hydroxide, sulfide, carbonate, sulfate, and mixtures thereof, wherein the inorganic also contains an element selected from Ca, Mg, Ti, Ba, Zn, Zn, Mo, Si, and Al.

In the first aspect, the disclosure provides the treated pigment further comprising: (c) at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, and mixtures thereof.

In a second aspect, the disclosure provides a part comprising a polymer and a treated pigment, wherein the treated pigment comprises:

(a) an inorganic pigment; and (b) an organic compound comprises a fluoroalkyl group and a hydrocarbon group and having the structure:

$$R_H\text{-L-}R_F$$

wherein $R_F$ is a fluorochemical component containing at least one Zerewitinoff hydrogen;

$R_H$ is selected from the group of an aliphatic group of 1-30 carbons, cycloaliphatic group of 3-30 carbons, an aromatic group of 6-30 carbons, and a group having the structure: R'—(OCH$_2$CHR")$_{x'}$—(OCH$_2$CH$_2$)$_{y'}$—O—, wherein R' is H or an aliphatic group of 1-20 carbons, R" is H or methyl; and x' and y' are the same or different integers ranging from 0-20 except that the sum of x' and y' is not 0 when R' is H, preferably x' is 0 and y ranges from 3 to 10, and mixtures thereof; and L is selected from the group CO, isocyanate, and a mixture of polyisocyanates containing at least three isocyanate groups per $R_H$-L-$R_F$ structure.

In the second aspect, the disclosure provides a part, typically a film, comprising a treated pigment, wherein the treated pigment further comprises at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, and mixtures thereof.

In a third aspect the disclosure relates to an extruded plastic article having easy cleanability comprising an inorganic pigment and an organic compound comprises a fluoroalkyl group and a hydrocarbon group and having the structure:

$$R_H\text{-}L\text{-}R_F$$

wherein $R_F$ is a fluorochemical component containing at least one Zerewitinoff hydrogen;

$R_H$ is selected from the group of an aliphatic group of 1-30 carbons, cycloaliphatic group of 3-30 carbons, an aromatic group of 6-30 carbons, and a group having the structure: $R'$—$(OCH_2CHR'')_{x'}$—$(OCH_2CH_2)_{y'}$—O—, wherein $R'$ is H or an aliphatic group of 1-20 carbons, $R''$ is H or methyl; and $x'$ and $y'$ are the same or different integers ranging from 0-20 except that the sum of $x'$ and $y'$ is not 0 when $R'$ is H, preferably $x'$ is 0 and y ranges from 3 to 10, and mixtures thereof; and L is selected from the group CO, isocyanate, and a mixture of polyisocyanates containing at least three isocyanate groups per $R_H$-L-$R_F$ structure.

DETAILED DESCRIPTION OF THE INVENTION

The disclosure relates to a process for treating an inorganic pigment, typically a titanium dioxide pigment, to form a pigment capable of being dispersed into a polymer melt and that imparts cleanability to the plastic part such as a film. The resulting plastic material when soiled with an agent shows faster soil removal than a similar plastic material not comprising the treated oxide described in this disclosure.

Treated Pigment:

The treated pigment comprises an inorganic pigment; and an organic compound comprises a fluoroalkyl group and a hydrocarbon group having a specified structure.

Organic Compound (b):

The organic compounds (b) of this disclosure comprise a fluoroalkyl group and a hydrocarbon group and have the structure: $R_H$-L-$R_F$, wherein $R_F$ is a fluorochemical component containing at least one Zerewitinoff hydrogen; $R_H$ is selected from the group of an aliphatic group of 1-30 carbons, cycloaliphatic group of 3-30 carbons, an aromatic group of 6-30 carbons, and a group having the structure: $R'$—$(OCH_2CHR'')_{x'}$—$(OCH_2CH_2)_{y'}$—O—, wherein $R'$ is H or an aliphatic group of 1-20 carbons, $R''$ is H or methyl; and $x'$ and $y'$ are the same or different integers ranging from 0-20 except that the sum of $x'$ and $y'$ is not 0 when $R'$ is H, preferably $x'$ is 0 and y ranges from 3 to 10, and mixtures thereof; and L is selected from the group CO, isocyanate, and a mixture of polyisocyanates containing at least three isocyanate groups per $R_H$-L-$R_F$ structure.

A "Zerewitinoff hydrogen" is an active hydrogen which will react with a methyl magnesium halide (Grignard reagent) to liberate methane. The reaction is quantifiable by the method of Zerewitinoff et al., wherein an organic compound containing an active hydrogen such as —OH, —COOH, and the like is reacted with a methylmagnesium halide to liberate methane. Volumetric measurement of the methane permits a quantitative estimate of the active hydrogen content of the compound. Primary amines give 1 mol when reacted in the cold, usually 2 mol when heated (see Organic Chemistry by Paul Karrer, English translation published by Elsevier, 1938, p. 135). For purposes of this disclosure, it is assumed that a primary amine provides one active hydrogen as defined by Zerewitinoff et al. A Zerewitinoff hydrogen reacts with isocyanate groups to form urethanes.

The organic compound is prepared from (1) an isocyanate reactant, (2) a fluorochemical reactant, (3) a non-fluorinated reactant, and optionally (4) water.

The isocyanate reactant from which the group denoted by L of the structure $R_H$-L-$R_F$ is derived may be any diisocyanate or polyisocyanate having three or more isocyanate groups. For example, one may use hexamethylene diisocyanate homopolymers having the formula:

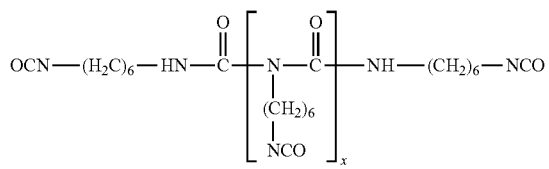

wherein x is an integer equal to or greater than 1 typically between 1 and 8. Because of their commercial availability, mixtures of such hexamethylene diisocyanate homopolymers are typical for purposes of this disclosure. Also of interest are hydrocarbon diisocyanate-derived isocyanurate trimers that may be represented by the formula:

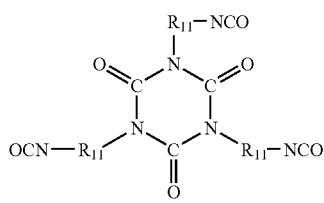

wherein $R_{11}$ is a divalent hydrocarbon group, typically an aliphatic group containing 3 to 12 carbon atoms, an acyclic group containing from 3 to 12 carbon atoms, an aromatic group containing 6 to 12 carbon atoms, or an arylaliphatic group containing 7 to 12 carbon atoms. For example, $R_{11}$ can be hexamethylene, toluene, or cyclo-hexylene, more typically hexamethylene.

Other polyisocyanates useful for the purposes of this disclosure are those obtained by reacting three mol of toluene diisocyanate with I,I,I-tris-(hydroxymethyl)ethane or I,I,I-tris-(hydroxymethyl)propane. The isocyanurate trimer of toluene diisocyanate and that of 3-isocyanatomethyl-3,4,4-trimethylcyclohexyl isocyanate are other examples of polyisocyanates useful for the purposes of this disclosure, as is methine-tris-(phenylisocyanate).

Also useful for the purposes of this disclosure is the polyisocyanate having the formula:

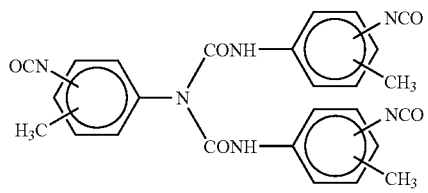

Suitable commercially available diisocyanates are exemplified by DESMODUR H (1,6-hexamethylene diisocyanate, HMDI), DESMODUR W (bis[4-isocyanatocyclohexyl] methane, PICM), MONDUR TD (a mixture of toluene diisocyanate isomers, specifically 2,4-diisocyanato-1-methylbenzene and 1,3-diisocyanato-2-methylbenzene, TDI), MONDUR M (4,4'-diisocyanatodiphenylmethane, MDI), and isophorone diisocyanate (5-isocyanato-1-(isocyanatomethyl)-1,3,3-trimethyl-cyclohexane, IPDI) each available from Aldrich Chemical Co., Milwaukee Wis.

Suitable preformed commercially available extended diisocyanates are exemplified by DESMODUR 3200 and DESMODUR N-100 (hexamethylene diisocyanate homopolymers) available from Bayer Corporation, Pittsburgh Pa., both presumably prepared by the process described in U.S. Pat. No. 3,124,605 to give mixtures of the mono-, bis-, tris-, tetra-, and higher order derivatives. Also suitable is DESMODUR 3300 (a hexamethylene derived isocyanurate trimer), and CYTHANE 3160 (a glycerol based isocyanate) available from American Cyanamid, Stamford Conn.

Typical properties of such extended diisocyanate compounds are as follows:

| Typical Properties | Ave. Eq. Wt. | NCO Content. % |
|---|---|---|
| DESMODUR N-100 | 191 | 22.0 |
| DESMODUR N-3200 | 181 | 23.2 |

The typical NCO content of Desmodur N-100 approximates that listed for a SRI International Report (Isocyanates No. 1D, July, 1983, Page 279) hexamethylene diisocyanate homopolymer with the following composition:

| Product Composition | Wt. % |
|---|---|
| Hexamethylene diisocyanate | 0.1 |
| Monobiuret | 44.5 |
| Bisbiuret | 17.4 |
| Trisbiuret | 9.5 |
| Tetrabiuret | 5.4 |
| Higher Mol. Wt. Derivatives | 23.1 |
| NCO Content | 21.8 |

Based on its average equivalent weight and NCO content, the comparative bis, tris, tetra, etc., content of DESMODUR N-3200 should be less than that of the N-100 product. DESMODUR N-3300 is a hexamethylene diisocyanate-derived isocyanurate trimer of formula

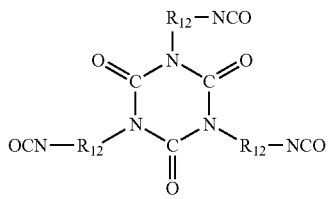

wherein $R_{12}$ is hexamethylene.

A wide variety of fluorochemical compounds, from which the group denoted by $R_F$ in the structure $R_H$-L-$R_F$ is derived, can be used as the fluorochemical reactant so long as the fluorochemical compound contains at least two carbon atoms and each carbon atom is bonded to at least two fluorine atoms. For example, the fluorochemical compound can be represented by the formula:

$$R_f—R_k—X_a—H$$

wherein $R_f$ is a monovalent aliphatic group containing at least two carbon atoms and up to about 18 carbon atoms each of which is bonded to at least two fluorine atoms;

R is a divalent organic radical, typically an alkyl group containing 2 to 10 carbon atoms or an aryl group containing 6 to 10 carbon atoms or an aralkyl group containing 7 to 10 carbon atoms, typically R is ethylene;

k is 0 or 1; and $X_a$ is —O—, —S—, or —N($R_1$)— in which $R_1$ is H, an alkyl group containing 1 to 6 carbon atoms or an $R_f$—$R_k$— group, where in $R_f$, R and k are defined above.

In a more specific embodiment, the fluorochemical compound contains a single functional group and can be represented by the formula:

$$R_f—R_{ak}—R_2—X_b—H$$

wherein $R_f$ and k are as defined above;

$R_a$ is a divalent radical of the formula: —$C_mH_{2m}$SO—, —$C_mH_{2m}$SO$_2$—, —SO$_2$N($R_3$)—, or —CON($R_3$)— in which m is 1 to 22 and $R_3$ is H or a divalent alkyl group of 1 to 6 carbon atoms;

$R_a$ is a divalent radical of the formula: —$C_mH_{2m}$ SO—, —$C_mH_{2m}$ SO$_2$—, —SO$_2$N($R_3$)—, or —CON($R_3$)— in which m is 1 to 22 and $R_3$ is H or a divalent alkyl group of 1 to 6 carbon atoms;

$R_2$ is a divalent linear hydrocarbon radical of the formula —$C_nH_2n$— which is optionally end-capped with

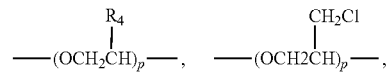

or either of the following two units:

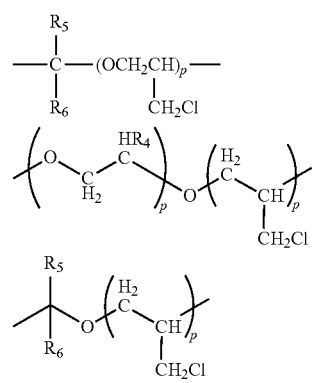

in which n is an integer ranging from 1 to 12, p is an integer ranging from 1 to 50;

$R_4$, $R_5$ and $R_6$ are the same or different and are H or an alkyl group containing 1 to 6 carbon atoms;

$X_b$ is O, S, or N($R_7$) in which $R_7$ is H, an alkyl group containing 1 to 6 carbon atoms, or a group having the structure $R_f$—$R_k$—$R_2$—, in which $R_f$, R, k and $R_2$ are defined above.

More particularly, $R_f$ can be a fully-fluorinated straight or branched aliphatic radical of 3 to 18 carbon atoms that can be interrupted by oxygen atoms.

In a preferred embodiment, the fluorochemical compound can be represented by the formula:

$$R_f-(CH_2)_q-X_b-H$$

wherein $R_f$ is defined hereinabove, $X_b$ is O, S, or $N(R_{c7})$ in which $R_{c7}$ is H, an alkyl group containing 1 to 6 carbon atoms or a group having the structure $R_{af}-R_k-R_2-$ in which R, k and $R_2$ are defined above, $R_{af}$ is a mixture of perfluoroalkyl groups, $CF_3CF_2(CF_2)_r$ in which r is an integer ranging from 2 to 18; and q is 1, 2 or 3.

In a more particular embodiment, $R_{af}$ is a mixture of said perfluoroalkyl groups having the structure $CF_3CF_2(CF_2)_r$; and r is 2, 4, 6, 8, 10, 12, 14, 16, or 18. In an even more preferred embodiment, r is predominantly 4, 6 or 8. In another preferred embodiment, r is predominately 6 or 8. The former preferred embodiment is more readily available commercially and is therefore less expensive, while the latter may provide improved properties.

Representative fluoroaliphatic alcohols that can be used for the purposes of this disclosure are:

$$C_sF_{(2s+1)}(CH_2)_t-OH,$$

$$(CF_3)_2CFO(CF_2CF_2)_uCH_2CH_2OH,$$

$$C_sF_{(2s+1)}CON(R_8)-(CH_2)_t-OH,$$

$$C_sF_{(2s+1)}SO_2N(R_8)-(CH_2)_t-OH, \text{ and}$$

$$C_sF_{(2s+1)}SO_2N(R_8)-\underset{R_9(CH_2Cl)_v}{\overset{R_9}{C}}(OCH_2CH)-OH$$

wherein s is 3 to 14; t is 1 to 12; u is 1 to 5; each of $R_8$ and $R_9$ is H or an alkyl group containing 1 to 6 carbon atoms.

In another embodiment, the fluorochemical compound can be represented by the formula:

$$H(CF_2CF_2)_wCH_2OH$$

wherein w is 1-10. The latter fluorochemical compound is prepared by reacting tetrafluoroethylene with methanol. Yet another such compound is 1,1,1,2,2,2-hexafluoro-isopropanol having the formula:

$$CF_3(CF_3)CHOH.$$

When the fluorochemical reactant is a fluorinated alcohol, suitable fluorinated alcohols can have the structure $R_{cf}CH_2CH_2OH$ wherein $R_{cf}$ is a $C_2$-$C_{18}$ perfluorocarbon are exemplified by, but not limited to perfluoroalkyl ethanols available commercially as ZONYL BA and BA-N Fluorotelomer Intermediate from E.I. du Pont de Nemours and Company, Wilmington Del. ZONYL BA and BA-N contain alpha-fluoro-omega-(2-hydroxyethyl)-poly(difluoromethylene) in the form of a mixture of the components of the homologous series of the formula $$F(CF_2CF_2)_n(CH_2CH_2)OH,$$

containing therein:

for n=2, BA contains 1%-2%, BA-N contains <1%
for n=3, BA contains 27%-34%, BA-N contains 3%-8%
for n=4, BA contains 29%-34%, BA-N contains 45%-50%
for n=5, BA contains 17%-21%, BA-N contains 28%-33%
for n=6, BA contains 6%-9%, BA-N contains 8%-13%
for n=7, BA contains 2%-5%, BA-N contains 1%-6%
for n=8, BA contains 1%-2%, BA-N contains 1%-6%

Suitable fluorinated thiols of the structure $R_{cf}CH_2CH_2SH$ wherein $R_{cf}$ is a $C_2$-$C_{20}$ perfluorocarbon of the second reactant are exemplified by LODYNE 924, commercially available from Ciba-Geigy, Ardsley N.Y. Suitable fluorinated sulfonamides of the structure $R_{cf}SO_2N(CH_2CH_3)CH_2CH_2OH$ wherein $R_{cf}$ is a $C_2$ to $C_{20}$ perfluoro group are exemplified by FLUORAD FC-10 available from 3M Company, Minneapolis, Minn.

In another embodiment, water-modified fluorochemical carbamates have been prepared by the sequential catalyzed reaction of DESMODUR N-100, DESMODUR N-3200, or DESMODUR N-3300, (hexamethylene diisocyanate homopolymers available from Bayer Corporation, Pittsburgh, Pa.) or mixtures thereof, with a stoichiometric deficiency of a perfluoroalkyl compound containing one functional group, then with a non-fluorinated reactant as described below, and then with water.

The nonfluorinated reactant from which the group denoted by R in the structure $R_H$-L-$R_F$ is derived and those that can be used in the surface treatment of the present disclosure comprises a non-fluorinated organic compound that contains a single functional group. Usually between about 1% to about 60% of the isocyanate groups of the polyisocyanate are reacted with at least one such non-fluorinated compound. For example, said non-fluorinated compound can be represented by the formula:

$$(R_{10})-(R_2)_k-YH$$

wherein $R_{10}$ is a $C_1$-$C_{18}$ alkyl group, a $C_1$-$C_{18}$ omega-alkenyl radical or a $C_1$-$C_{18}$ omega-alkenoyl;

$R_2$ is a divalent linear hydrocarbon radical of the structure $-C_nH_{2n}$-optionally end-capped by $$-(OCH_2\overset{R_4}{\underset{}{C}}H)_p-, \quad -(OCH2\overset{CH_2Cl}{\underset{}{C}}H)_p-,$$

or wherein $R_4$, $R_5$ and $R_6$ are the same or different and are H or an alkyl group of 1 to 6 carbon atoms;

n is 1 to 12, and p is 1 to 50;

Y is O, S, or $N(R_{a7})$ in which $R_{a7}$ is H or an alkyl group containing 1 to 6 carbon atoms; and k is 0 or 1.

For example, the non-fluorinated reactant can be an alkanol or a monoalkyl or monoalkenyl ether or ester of a polyoxyalkylene glycol. Particular examples of such compounds include stearyl alcohol, the monomethyl ether of polyoxyethylene glycol, the mono-allyl or -methallyl ether of polyoxyethylene glycol, the mono-methacrylic or acrylic acid ester of polyoxyethylene glycol, cyclohexanol, benzyl alcohol. Additionally, propanol, i-butanol, n-butanol, t-butanol, hexanol, i-octadecanol, n-octadecanol, t-octadecanol, and methyl, ethyl, i-buyl, n-butyl or t-butyl end-capped polyethylene glycol can be used.

An example of a particularly useful organic compound is a self dispersing fluorinated polyurethane having the structure:

$$R_H\text{-L-}R_F$$

wherein

R$_F$ is a fluorinated alcohol;

R$_H$ is a group having the structure: R'—(OCH$_2$CHR")$_{x'}$—(OCH$_2$CH$_2$)$_{y'}$—, wherein R' is H or an aliphatic group of 1-20 carbons, R" is H or methyl; and x' is 0 and y' is an integer ranging from 5 to 20; and L is an extended diisocyanate.

In one example, R$_H$ comprises an aliphatic hydrocarbon of 1-30 carbons, L is CO and R$_F$ is C$_{n_c}$F$_{(2n_c+1)}$CH$_2$CH$_2$—O—, wherein n$_c$ is an integer ranging from 2 to 18.

In one embodiment the organic compound (b), more particularly a polyurethane, used in this disclosure is prepared by reacting: (1) at least one diisocyanate, or polyisocyanate or mixture of polyisocyanates which contains at least three isocyanate groups per molecule with (2) at least one fluorochemical compound which contains per molecule (a) a single functional group having one or more Zerewitinoff hydrogen atoms and (b) at least two carbon atoms each of which is bonded to at least two fluorine atoms, and (3) at least one non-fluorinated reactant as described above. Thereafter the remaining isocyanate groups can be optionally reacted with water to form one or more urea linkages or can be reacted completely with the previously described second and third reactants to form urea, carbamate, or thiocarbamate linkages.

Usually between about 40% and about 95% of the isocyanate groups will have been reacted before water is optionally reacted with the diisocyanate or polyisocyanate. In other words, the amount of water generally is sufficient to react with from about 5% to about 60% of the isocyanate groups in the diisocyanate or polyisocyanate. Typically, between about 60% and 95% of the isocyanate groups have been reacted before water is optionally reacted with the diisocyanate or polyisocyanate, and most typically between about 80% and 90% of the isocyanate groups have been reacted prior to reaction of water. Thus, in a preferred embodiment the amount of water is sufficient to react with about 5% to about 35% of the isocyanate groups, most typically between 10% and 20%.

The preparation of the organic compound (b), more particularly a polyurethane, is exemplified by reacting, in the presence of a catalyst, an alkyl-terminated polyalkylene glycol, a fluoroalcohol or fluorothiol, and optionally an alcohol, thiol, or amine, with a diisocyanate or extended diisocyanate in a suitable solvent such as methylisobutylketone solution. Suitable catalysts are well known to those skilled in the art. For instance the catalyst can be a metal organic exemplified by dibutyl tin dilaurate or tin octoate, or a tertiary amine, exemplified by trialkylamines, pyridine, ethyl morpholine, 1,4-diazabicyclo[2.2.2]octane (DABCO, Aldrich Chemical Co., Milwaukee Wis.) or 1,8-diazabicyclo[5.4.0]undec-7-ene (DBU, Aldrich Chemical Co., Milwaukee Wis.). The reaction product is optionally further reacted with water to give a polyurethane in methylisobutylketone. The polyurethane in methylisobutylketone is emulsified in water. In most cases emulsification occurs readily with mixing. Emulsification is optionally facilitated by the use of homogenizing equipment and the use of anionic (e.g., alkyl sulfonates) or nonionic (e.g., alcohol ethoxylates or alkylphenol ethoxylates) surfactants chosen for compatibility with the water-dispersed coating composition. The methylisobutylketone solvent is removed under reduced pressure to leave an aqueous dispersion. This dispersion is then added to an existing water-dispersed coating composition and mixed thoroughly. The resulting modified water-dispersed coating composition is applied by standard means.

Suitable solvents for the reaction are exemplified by ketones such as methylisobutylketone, methyl amyl ketone, and methyl ethyl ketone; esters such as ethyl acetate; and aromatic solvents such as toluene or xylene.

The water-modified fluorochemical carbamates are typically prepared by first charging the diisocyanate or polyisocyanate, the perfluoroalkyl compound, and a dry organic solvent such as methylisobutylketone to a reaction vessel. The order of reagent addition is not critical. The specific weight of aliphatic diisocyanate, polyisocyanate, and perfluoroalkyl compounds charged is based on their equivalent weights and on the working capacity of the reaction vessel and is adjusted so that all Zerewitinoff active hydrogens of the third reactant charged will react with some desired value between 40% and 100% of the total NCO group charge. The weight of dry solvent is typically 15%-30% of the total charge weight. The charge is agitated under nitrogen and heated to 40-70° C. A catalyst, typically dibutyl tin dilaurate per se, or as a solution in methylisobutylketone, is added in an amount which depends on the charge, but is usually small, e.g., 1 to 2 parts per 10,000 parts of the diisocyanate or polyisocyanate. After the resultant exotherm, the mixture is agitated at a temperature between 65 and 105° C. for 0-20 hours from the time of the catalyst addition, and then, after its temperature is adjusted to between 55 and 90° C., is treated with water per se or with wet methylisobutylketone for an additional I to 20 hours. The resultant product is stored and/or used as prepared or after further solvent dilution, or converted by standard technology to an emulsion or dispersion. In some instances, the emulsion or dispersion is surfactant-stabilized; in others, a stable emulsion or dispersion can be prepared without the use of a surfactant.

The emulsions of organic compound (b), more particularly a polyurethane, are formed by sequentially reacting isocyanate, fluorinated, and non-fluorinated reactants, further extending the reaction product by reaction with water, and finally preparing an aqueous emulsion by adding water, optionally emulsification aids, and removing residual organic solvents.

The organic compound may be present in the amount of about 0.1 to about 10 weight %, typically about 0.2 to about 5 weight %, more typically about 0.5 to about 3 weight %, based on the total amount of the treated pigment. Typically the loading of the organic compound is such that in the final end use application the treated TiO2 pigment delivers from 200-10,000 ppm organic compound as measured by elemental fluorine and most typically from 500-1000 ppm organic compound as measured by elemental fluorine.

Inorganic Pigment (a):

It is contemplated that any inorganic pigment will benefit from being treated with the organic compound described in this disclosure. By inorganic pigment it is meant an inorganic particulate material that becomes uniformly dispersed throughout a polymer melt and imparts color and opacity to the polymer melt. The inorganic pigment may be selected from an oxide, mixed oxides, a hydroxide, a sulfide, a carbonate, a sulfate, of Ca, Mg, Ti, Ba, Zn, Zn, Mo, Si, and Al, and mixtures thereof. Some examples of inorganic pigments include but are not limited to ZnS, TiO$_2$, CaCO$_3$, BaSO$_4$, ZnO, MoS$_2$, talc and clay. In particular, titanium dioxide is an especially useful pigment in the processes and products of this disclosure.

Titanium dioxide (TiO$_2$) pigment useful in the present disclosure may be in the rutile or anatase crystalline form. It may be made by either a chloride process or a sulfate process. In the chloride process, TiCl$_4$ is oxidized to TiO$_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

By "pigment" it is meant that the titanium dioxide particles have an average size of less than 1 micron. Typically, the particles have an average size of from 0.020 to 0.95 microns, more typically, 0.050 to 0.75 microns and most typically 0.075 to 0.50 microns.

Titanium dioxide particles suitable for use in the disclosure may be those that have been substantially encapsulated with a pyrogenic oxide. "Substantially encapsulated", as used herein, means that the surface of the titanium dioxide particle may be predominately covered with a layer of pyrogenic oxide. Methods such as, for example, those disclosed in co-owned, co-pending U.S. Patent Publication No. 2003/0051635, are particularly suitable for producing titanium dioxide particles substantially encapsulated with a pyrogenic oxide.

The composition of the oxide for pigment treatment may be an amorphous pyrogenically-deposited oxide. Typically, the pyrogenically-deposited oxide is silica, alumina, zirconia, phosphoria, boria, or mixtures thereof. More typical is silica, such as pyrogenic silica deposited by a process disclosed in U.S. Patent Publication No. 2003/0051635. The thickness of the treatment layer deposited is typically in a range of from about 2 to about 6 nm, but any amount of deposited pyrogenic oxide is suitable. The particles are typically more than 99% rutile.

Organic Surface Treatment Material (c):

Suitable organic surface treatment materials that may optionally be used to treat the inorganic pigment may include, but are not limited to, for example, organo-silanes; organo-siloxanes; fluoro-silanes; organo-phosphonates; organo-phosphoric acid compounds such as organo-acid phosphates, organo-pyrophosphates, organo-polyphosphates, and organo-metaphosphates; organo-phosphinates; organo-sulfonic compounds; hydrocarbon-based carboxylic acids and associated derivatives and polymers; hydrocarbon-based amides; low molecular weight hydrocarbon waxes; low molecular weight polyolefins and co-polymers thereof; hydrocarbon-based polyols and derivatives thereof; alkanolamines and derivatives thereof; and commonly utilized organic dispersing agents; all the above utilized either individually or as mixtures, applied in concert or sequentially. Typically, the surface of the titanium dioxide particles substantially encapsulated with a pyrogenically-deposited oxide are treated with an organo-silane.

Suitable organo-silanes for use in the practice of this disclosure include silanes disclosed in U.S. Pat. No. 5,560,845 issued to Birmingham, Jr. et al. on Oct. 1, 1996, having the general formula $$SiR^1R^2R^3R^4 \quad (I)$$

in which at least one R group of the aforementioned $R^1$, $R^2$, $R^3$, or $R^4$ is a non-hydrolyzable organic group, such as alkyl having 1 to 20 carbon atoms, cycloalkyl having 4 to 20 carbon atoms, aryl having 6 to 20 carbon atoms, or aralkyl having 7 to 20 carbon atoms, and at least one of these R groups is a hydrolyzable group such as alkoxy having 2 to 20 carbon atoms, halogen, acetoxy having 2 to 20 carbon atoms, or hydroxy. The other two R groups are, the same or different, hydrolyzable or non-hydrolyzable as above. It is preferred that at least two, and especially that three, of the R groups are hydrolyzable. The non-hydrolyzable R group can be fully or partially fluorine substituted. A silane having the foregoing description is herein called "organo-silane" in reference to the non-hydrolyzable R group(s). Organo-silanes may be linear or branched, substituted or unsubstituted, and saturated or unsaturated. Typically, non-hydrolyzable R groups are non-reactive. Alkyl, cycloalkyl, aryl, and aralkyl are typical non-hydrolyzable R groups, with alkyl being most typical, including the possibility of any of these groups being fully or partially fluorine substituted. When the hydrolyzable R groups, of the aforementioned $R^1$, $R^2$, $R^3$, or $R^4$, are identical, the organo-silane can be represented by $$R^5_x SiR^6_{4-x} \quad (II)$$

wherein $R^5$ is non-hydrolyzable and $R^6$ is hydrolyzable as defined above and x is an integer ranging from 1 to 3. Typically $R^6$ includes methoxy, ethoxy, chloro, and hydroxy. Ethoxy is more typical for ease of handling. Typical organo-silanes include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Mixtures of organo-silanes can be used.

In embodiments utilizing organo-silanes represented by Formula II, typical silanes are where $R^5$ is a hydrocarbon group having 8-18 carbon atoms; $R^6$ is ethoxy; and x is an integer ranging from 1 to 3. The $R^5$ group having 8-18 carbon atoms are typical, for example for enhanced processibility. $R^6$ is ethoxy typically for ease of handling. Most typical is octyltriethoxysilane.

Suitable organo-siloxanes for use in the practice of this disclosure are of the general formula $$[R^7_{n_b}SiO_{(4-n)/2}]_{m_b} \quad (III)$$

in which $R^7$ may be an organic group, typically a $C_1$ to $C_{22}$ alkyl group, a $C_3$ to $C_{22}$ cycloalkyl group, a $C_6$ to $C_{22}$ aryl group, or a $C_7$ to $C_{22}$ aralkyl group, typically $R^7$ is methyl or phenyl or mixtures thereof, $n_b$ is an integer ranging from 0 to 3, and $m_b$ is greater than or equal to 2, typically from 2 to 1500.

Polydimethylsiloxane (PDMS), terminated in a multitude of different ways, for example, by trimethylsilyl functionality, and the like are the preferred polysiloxanes. Additionally useful organo-siloxanes include, for example, polymethylhydrosiloxane (PMHS) and polysiloxanes derived from the functionalization (by hydrosilylation) of PMHS with olefins.

Organo-silanes and polysiloxanes are commercially available or can be prepared by processes known in the art. See, for example, S. Pawlenko, "Organosilicon Compounds", G. Thieme Verlag, New York (1980).

Suitable organo-phosphonates for use in the practice of this disclosure are disclosed in U.S. Pat. No. 5,837,049 issued to Watson et al. on Nov. 17, 1998, and have the general formula $$\begin{array}{c} OR^9 \\ | \\ R^8-P=O \\ | \\ OR^{10} \end{array} \quad (IV)$$

in which $R^8$ is $C_1$ to $C_{22}$ alkyl group or a $C_3$ to $C_{22}$ cycloalkyl group and $R^9$ and $R^{10}$ are the same or different, hydrogen, a $C_1$ to $C_{22}$ alkyl group, a $C_3$ to $C_{22}$ cycloalkyl group, a $C_6$ to $C_{22}$ aryl group, or a $C_7$ to $C_{22}$ aralkyl group. Typically, $R^8$ is a straight chain alkyl group containing from 4-20, and even more typically 6-20 carbon atoms. However, organo-phosphonates possessing linear or branched, substituted or unsubstituted and saturated and unsaturated $R^8$, $R^9$ and $R^{10}$ groups are suitable for use. Organo-phosphonates of use include n-octylphosphonic acid and its esters, n-decylphosphonic acid and its esters, 2-ethylhexylphosphonic acid and its esters, and camphyl phosphonic acid and its esters.

When $R^9$ and $R^{10}$ are both hydrogen, the above Formula IV represents an organo-phosphonic acid, and when at least one of $R^9$ and $R^{10}$ is a hydrocarbyl group, the formula represents an ester of an organo-phosphonic acid. In the case of esters, $R^9$ and $R^{10}$ typically contain up to 10 carbon atoms and more typically up to 8 carbon atoms (i.e., the ester is an ester of an alcohol containing up to 10, and typically up to 8 carbon atoms). $R^9$ and $R^{10}$ can be different but frequently are the same. Suitable esters include ethyl esters, butyl esters, octyl esters, cyclohexyl esters, and phenyl esters.

In addition to the above described organo-phosphonates, one can also envision utilizing in the practice of this disclosure organo-phosphonate derivatives possessing hydrolyzable halogen functionality examples of which include, but are not limited to, n-octylphosphonic dichloride, n-decylphosphonic dichloride and 2-ethylhexylphosphonic dichloride.

Suitable organo-phosphoric acid compounds for use in the practice of this disclosure include an organo-acid phosphate, an organo-pyrophosphate, an organo-polyphosphate, an organo-metaphosphate, or a salt of any of the aforementioned organo-phosphoric acid compounds as disclosed in U.S. Pat. No. 6,713,543 issued to El-Shoubary et al. on Mar. 30, 2004. Suitable organo-acid phosphates have the general formula $$(R^{11}-O)_y PO(OH)_z \qquad (V)$$

wherein y=1 or 2; z=3−y; and $R^{11}$ is an organic group having from 2 to 22 carbon atoms.

The phrase "organo-acid phosphate" as used herein refers to a compound that may be represented by Formula V. In the organo-acid phosphate of Formula V, the organic groups may be linear or branched, substituted or unsubstituted, and saturated or unsaturated. Typically $R^{11}$ is a linear hexyl- or octyl-aliphatic group or a branched hexyl- or octyl-aliphatic group.

Suitable organo-pyrophosphate or organo-polyphosphate compounds may be represented by the formula:

$$R^{12}{}_a-P_{(a-2)}O_{4+[3(a-3)]} \qquad (VI)$$

wherein a=4-14; and each $R^{12}$ is an organic group having from 2 to 22 carbon atoms or hydrogen and within any one molecule, any two or more $R^{12}$ groups may be the same provided that at least one of the $R^{12}$ groups is not hydrogen.

The symbol $R^{12}$ as used in Formula VI denotes any organic group that contains from 2 to 22 carbon atoms or hydrogen. Within any molecule the $R^{12}$ groups may all be the same moiety or they may be different moieties. These organic groups may be linear or branched, substituted or unsubstituted, and saturated or unsaturated. If the $R^{12}$ groups are all the same moieties, then they cannot be hydrogen. Typically at least one of the $R^{12}$ groups is hydrogen and at least one of the $R^{12}$ groups will be linear hexyl or octyl aliphatic groups or branched hexyl or octyl aliphatic groups. Examples of organopyrophosphate acid compounds and organopolyphosphate acid compounds include caprylpyrophosphate, 2-ethylhexylpyrophosphate, dihexylpyrophosphate, dihexylammoniumpyrophosphate, dioctylpyrophosphate, diisooctylpyrophosphate, dioctyltriethanolaminepyrophosphate, bis(2-ethylhexyl)pyrophosphate, bis(2-ethylhexyl) sodium pyrophosphate, tetraethylpyrophosphate, tetrabuytipyrophosphate, tetrahexylpyrophosphate, tetraoctylpyrophosphate, pentahexyltripolyphosphate, pentaoctyltripolyphosphate, tetrahexyl sodium tripolyphosphate, tetrahexylammoniumtripolyphosphate, pentahexyl sodium tetrapolyphosphate, trioctyl sodium tetrapolyphosphate, trioctyl potassium tetrapolyphosphate, hexabutyltetrapolyphosphate, hexahexyltetrapolyphosphate, and hexaoctyltetrapolyphosphate.

Suitable organo-metaphosphate compounds may be represented by the formula:

$$(R^{13}PO_3)_b \qquad (VII)$$

wherein b=1-14, and each $R^{13}$ is an organic group having from 2 to 22 carbon atoms or hydrogen and within any one molecule, any two or more $R^{13}$ groups may be the same provided that at least one of the $R^{13}$ groups is not hydrogen.

The symbol $R^{13}$ as used in Formula VII denotes any organic group that contains from 2 to 22 carbon atoms or hydrogen. These organic groups may be linear or branched, substituted or unsubstituted, and saturated or unsaturated. "b" may be from about 1 to about 14, and typically "b" is from about 4 to about 14. Within any molecule, the $R^{13}$ groups may all be the same moiety or they may be different moieties. If the $R^{13}$ groups are all the same moieties, then they cannot be hydrogen. Typically at least one of the $R^{13}$ groups will be a linear hexyl or octyl aliphatic group or a branched hexyl or octyl aliphatic group. Examples of organo-metaphosphates include ethylmetaphosphate, propylmetaphosphate, butylmetaphosphate, hexylmetaphosphate, and octylmetaphosphate.

The organo-phosphoric acids of the present disclosure may be utilized in their acidic or salt forms. Examples of salts useful with the present disclosure are the potassium, sodium, ammonium, and aluminum salts and salts formed with alkanolamines such as triethanolamine of the substances identified by Formula V, Formula VI, or Formula VIII.

Organo-acid phosphates are readily available commercially or may be prepared by procedures known or knowable to those skilled in the art such as those procedures disclosed in U.S. Pat. No. 4,350,645, issued to Kurosaki et al. on Sep. 21, 1982. Organo-pyrophosphates and organo-polyphosphates are readily available commercially or produced according to the procedures that are known or easily knowable to persons skilled in the art. Organo-metaphosphates may also be produced according to the procedures that are known or easily knowable to persons skilled in the art. Examples of these procedures for synthesizing organo-pyrophosphates, organo-polyphosphates, and organo-metaphosphates are described in Alder, Howard and Woodstock, Willard Chem, Indus., 1942, 51:516.

Suitable organo-phosphinates for use in the practice of this disclosure include those which are represented by the general formulas $$R^{14}P(O)H(OR^{15}) \qquad (VIII)$$

and $$R^{16}R^{17}P(O)(OR^{18}) \qquad (IX)$$

wherein $R^{14}$, $R^{16}$, $R^{17}$ are the same or different alkyl groups containing 1 to 22 carbon atoms or cycloalkyl groups containing 4 to 22 carbon atoms and $R^{15}$ and $R^{18}$ are the same or different hydrogen, an alkyl group containing 1 to 22 carbon atoms, a cycloalkyl group containing 4 to 22 carbon atoms, an aryl group containing 6 to 22 carbon atoms, or an aralkyl group containing 7 to 22 carbon atoms. Typically, $R^{14}$, $R^{16}$, $R^{17}$ are straight chain alkyl groups containing from 1 to 20, more typically 4-20, and even more typically 6-20 carbon atoms. However, organo-phosphinates possessing linear or branched, alkyl or aryl substituted or unsubstituted and saturated and unsaturated $R^{14}$, $R^{15}$, $R^{16}$, $R^{17}$, and $R^{18}$ groups are suitable for use. $R^{16}$ and $R^{17}$ can be different but frequently are the same. Phosphorus compounds of use include, but are not limited to, n-hexylphosphinic acid and its esters (VIII), n-octylphosphinic acid and its esters (VIII), di-n-hexylphosphinic acid and its esters (IX) and di-n-octylphosphinic acid and its esters (IX).

When $R^{15}$ and $R^{18}$ are both hydrogen the above formula represents an organo-phosphinic acid and when at least one of $R^{15}$ and $R^{18}$ is a hydrocarbyl group the formula represents an ester of an organo-phosphinic acid. In the case of esters, typically, $R^{15}$ and $R^{18}$ contain up to 10 carbon atoms and more typically up to 8 carbon atoms (i.e. the ester is an ester of an alcohol containing up to 10, and typically up to 8 carbon atoms). Suitable esters include ethyl esters, butyl esters, octyl esters, cyclohexyl esters, and phenyl esters.

In addition to the above described organo-phosphinates, one can also envision utilizing in the practice of this disclosure organo-phosphinate derivatives possessing hydrolyzable halogen functionality examples of which include, but are not limited to, chloroethylphosphine oxide and chlorodiethylphosphine oxide.

Organo-sulfonic compounds, as disclosed in U.S. Pat. No. 6,646,037 issued to El-Shoubary et al. on Nov. 11, 2003, may in general be represented by Formula X, which includes not only organo-sulfonic acids, but also their salts. These organo-sulfonic compounds of Formula X may be synthesized de novo or obtained from commercial sources. Formula X is:

$$(R^{19}SO_3)_c M^{c+} \qquad (X)$$

where $R^{19}$ represents a saturated, unsaturated, branched, or linear organic group containing from 2 to 22 carbon atoms, or a saturated or unsaturated, cyclic organic group having from 3 to 22 carbon atoms; c is 1, 2, 3, or 4; and M represents a hydrogen atom, a metal ion, ammonium ion or organoammonium ion such as protonated triethanolamine. Typically, if M is a metal ion, it is a metal ion with a valence of +1, +2, +3, or +4 such as $Na^{1+}$, $Ca^{2+}$, $Mg^{2+}$, $Al^{3+}$, or $Ti^{4+}$. Typically, $R^{19}$ is hexyl-, octyl-, or 2-ethylhexyl-.

Suitable hydrocarbon-based carboxylic acids for use in the practice of this disclosure include those that possess linear or branched, substituted or unsubstituted and saturated or unsaturated (including aromatic) functionality as well as one or more carboxylic acid groups. Typically, said acids will possess about 2-28, more typically 2-18, and most typically 2-12 carbon atoms. Said acids can be applied to the particle surface both as the free acid or as a neutralized salt. Examples of suitable acids include maleic, malonic, fumaric, benzoic, phthalic, stearic, oleic, and linoleic.

Also suitable for use in the practice of this disclosure are esters and partial esters formed by the reaction of the above described hydrocarbon-based carboxylic acids with organic hydroxy compounds that possess linear or branched, substituted or unsubstituted, and saturated or unsaturated (including aromatic) functionality and, typically, 1 to 6 hydroxyl (OH) groups. Examples of appropriate non-aromatic hydroxy compounds include, but are not limited to, ethylene glycol, propylene glycol, trimethylolpropane, diethanolamine, triethanolamine, glycerol, hexanetriol, erythritol, mannitol, sorbitol, and pentaerythritol. Examples of appropriate aromatic hydroxy compounds include, but are not limited to, bisphenol A, hydroquinone, and phloroglucinol. Said esters and partial esters are described in U.S. Pat. No. 5,288,320 issued to Decelles on Feb. 22, 1994.

Polyesters derived from the self-condensation of, for example, 12-hydroxystearic acid or from, for example, the condensation of a dicarboxylic acid containing compound with a dihydroxyl containing compound can also be utilized for the current disclosure.

Suitable hydrocarbon-based amides for use in the practice of this disclosure include those that possess linear or branched, substituted or unsubstituted and saturated or unsaturated (including aromatic) functionality. Typically, said amides will possess about 8-22, more typically 12-22, and most typically 18-22 carbon atoms. Examples of suitable amides include stearamide, oleamide, and erucamide.

Also suitable for use in the practice of this disclosure are surface treatments derived from relatively low molecular weight hydrocarbon waxes and polyolefins, the latter either homopolymeric, for example, polyethylene or polypropylene, or derived from the co-polymerization of, for example, ethylene with one or more of propylene, butylene, vinylacetate, acrylates, or acrylamide.

In addition to the above described additives, one can also utilize as particle surface treatments in the practice of this disclosure hydrocarbon-based polyols, alkanolamines, and derivatives thereof, for example, esters and partial esters. Examples of said polyols include species such as glycerol and the commonly utilized particle grinding aids trimethylolethane and trimethylolpropane. Examples of said alkanolamines include diethanolamine and triethanolamine.

Common organic dispersing agents that may be of use in the practice of this disclosure include, but are not limited to, citric acid, polyacrylic acid, and polymethacrylic acid as well as the more complex, specialty polymeric organic dispersing agents possessing anionic, cationic, zwitterionic, or nonionic functionality and whose structures are typically trade secrets but are usually derived from linear, comb, star, brush, or dendrimer based polymer chain and pendant substituent morphologies.

Note that, in conjunction with the above, organic surface treatments may also be used various inorganic based dispersing aids which are usually phosphate, polyphosphate, pyrophosphate, and metaphosphate derived and are typically added, either as the acids or associated salts, to particle slurries.

Mixtures of organic surface treatment materials are contemplated, including mixtures of organic surface treatment materials from within one class of compounds, for example mixtures of organo-silanes, or mixtures of organic surface treatment materials from within two or more classes, for examples mixtures organo-silanes and organo-phosphonates.

Weight content of the organic surface treatment material, based on total weight of the treated pigment, may be typically about 0.05 to about 5 weight %, and more typically about 0.1 to about 1.5 weight %. Weight content of the organic surface treatment material in excess of 5 weight % may also be used.

Process for adding the Pigment Treatment:

The method of adding the at least one organic surface treatment material to the inorganic pigment, particularly titanium dioxide particles, substantially encapsulated with pyrogenically-deposited inorganic oxide of the present disclosure is not especially critical, and said inorganic pigment, particularly titanium dioxide particles, may be treated with the at least one organic surface treatment material in a number of ways. For example, the at least one organic surface treatment material can be added either neat or via solution to said inorganic pigment, particularly titanium dioxide particles, while said particles are either in a dry state or in a wet state. Examples involving the former state include, but are not limited to, the addition of said material (1) to conveyed particles via injector mixer technology such as that described in U.S. Pat. No. 4,430,001 or as described in WO 97/07879 published Mar. 6, 1997, and assigned to E.I. du Pont de Nemours and Company or (2) to particles undergoing deagglomeration in a micronizer (said material typically added to the micronizer feed block or to conveyed pigment up to about several feet past the exit of the micronizer) or in a dry media mill. Examples involving the latter state include, but are not limited to, the addition of said material (1) to particles present in slurry form either separate from or during filtration, (2) to particle wet cake after filtration but before drying, (3) to particles that are being dried by, for example, flash dryer or spray drier based techniques or (4) to particles undergoing deagglomeration via wet media milling techniques. In addition, the at least one organic surface treatment material can be added in portions at different processing stages. For example, one-half of said material can be added during a drying step and the remaining half at a subsequent stage such as during a deagglomeration operation such as during micronizing.

As described above for the initial treatments of organic surface treatment material, the method of adding additional treatments of organic surface treatment materials is not especially critical, and any of the aforementioned methods may be used for subsequent treatments. In a preferred embodiment, the additional layers of organic surface treatment material beyond the first layer of organic surface treatment material are added via the use of an apparatus for coating particles, such as pigmenty or granular materials, as described in WO 97/07879 published Mar. 6, 1997, and assigned to E.I. du Pont de Nemours and Company, or as described in U.S. Pat. No. 4,430,001. Use of said apparatus for encapsulating titanium dioxide particles with the organic surface treatment material involves metering a liquid composition comprising the organic surface treatment material, where the liquid composition is either a solution, slurry, or melt, into a flow restrictor and injecting a gas stream through the flow restrictor concurrently with the metering of the liquid composition comprising (b) and optionally (c) to create a zone of turbulence at the outlet of the flow restrictor, thereby atomizing the liquid composition. The gas stream can be heated, if necessary. Dried titanium dioxide particles substantially encapsulated with a pyrogenically-deposited oxide can be added to the zone of turbulence concurrently with the metering of the liquid composition and the injection of the heated gas to mix the titanium dioxide particles with the atomized liquid composition. Alternatively, said titanium dioxide particles can be added downstream of the zone of turbulence. The mixing at the zone of turbulence treats the inorganic pigment, and in particular titanium dioxide particles, with the organic surface treatment material.

Polymer:

Pigments disclosed herein can be employed to readily and uniformly fill a wide variety of thermoplastic resins, such as those disclosed in U.S. Pat. No. 5,397,391. These include, but are not limited to, such well known classes of thermoplastic resins as polyolefin resins, acrylic resins, polyester resins, polyamide resins, epoxy resins, phenolic resins, poly(vinylaromatic) resins, poly(vinylhalide) resins, polycarbonate resins, fluoropolymer resins, elastomeric polymer resins, polyurethaneurea resins, polyurethane resins, polyacetal resins, polyimide resins, polyetherimide resins, polyamideimide resins, polyetheretherketone resins, polyetherketoneketone resins, liquid crystal polymer resins and the like, and blends thereof. Representative, but non-limiting, examples of these various classes of thermoplastic resins include polyolefin resins such as polyethylene including, but not limited to, polyethylene made with conventional, high activity and metallocene-based catalyst systems such as, for example, ultra low density polyethylenes (ULDPE), very low density polyethylenes (VLDPE), linear low density polyethylenes (LLDPE), low density polyethylenes (LDPE), medium density polyethylenes (MDPE), high density polyethylenes (HDPE), high molecular weight high density polyethylenes (HMWHDPE), ultra high molecular weight high density polyethylenes (UHMWHDPE), ethylene/vinyl acetate (EVA) co-polymer, ethylene/methacrylic acid (EMA) co-polymer, and blends thereof, polypropylene including homopolymers, copolymers, compounded and in situ thermoplastic olefins, and the like, and blends thereof; acrylic resins such as poly(acrylic acid), poly(methacrylic acid), poly(methylacrylate), poly(methylmethacrylate), and the like, and blends thereof; polyester resins such as poly(ethylene terephthalate), poly(butylene terephthalate), poly(cyclohexylene-dimethylene terephthalate), poly(trimethylene terephthalate), poly(ethylene naphthalate), and the like, and blends thereof; polyamide resins such as nylon 6, nylon 6,6, nylon 6/6,6 co-polymer, nylon 11, nylon 6,10, nylon 6,12, amorphous nylon, and the like, and blends thereof; epoxy resins such as poly(epichlorohydrin/bisphenol A) and the like and esters thereof such as those prepared by the esterification of poly(epichlorohydrin/bisphenol A) with a fatty acid, resin acid, tall oil acid or mixtures thereof; phenolic resins such as those derived from the reaction of formaldehyde with phenol, resorcinol, cresol, p-phenylphenol, and the like, and blends thereof; poly(vinylaromatic) resins such as polystyrene and copolymers thereof such as poly(styrene-acrylonitrile), poly(acrylonitrile-styrene-butadiene), poly(acrylonitrile-styrene-acetate), and the like, and blends thereof; poly(vinylhalide) resins, such as poly(vinylchloride) which may be soft or hard, poly(vinylchloride/vinylidene chloride), and the like, and blends thereof; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with dimethyl or diphenyl carbonate to produce bisphenol A polycarbonate, and blends thereof; fluoropolymer resins, such as tetrafluoroethylene/perfluoro(propyl vinyl ether) (PFA) co-polymer, polyvinyl fluoride (PVF), polyvinylidene fluoride (PVDF), tetrafluoroethylene/hexafluoropropylene (FEP) co-polymer, ethylene/tetrafluoroethylene/perfluorobutyl ethylene (EFTE) ter-polymer, ethylene/chlorotrifluoroethylene (ECTFE) co-polymer, and the like, and blends thereof; elastomeric polymer resins such as natural rubber, synthetic rubber, acrylics, chlorosulfonated polyethylene, neoprene, silicones, urethanes, and the like, and blends thereof; polyurethaneurea resins such as polyether- and polyester-based spandex, and the like, and blends thereof; polyurethane resins obtained by the reaction of di- or poly-functional hydroxy compounds such as glycols or hydroxyl terminated polyesters and polyethers with di- or poly-isocyanate containing compounds, and the like, such as, for example, 4,4'-dicyclohexylmethane diisocyanate (HI 2MDI), hexamethyl diisocyanate (HDI), isophorone diisocyanate (IPDI), methylene diphenyl diisocyanate (MDI), toluene diisocyanate (TDI), tetramethylxylene diisocyanate (TMXDI), o-tolidine diisocyanate (TODI), 1,4-cyclohexane diisocyanate (CHDI), and blends thereof; polyacetal resins such as polyformaldehyde, copolymers of formaldehyde with cyclic ethers such as, for example, ethylene oxide, 1,3-dioxolane, and the like, and blends thereof; polyimide resins obtained by the reaction of an aromatic dianhydride such as pyromellitic dianhydride with an aromatic diamine such as p-phenylenediamine, and the like, and blends thereof; polyetherimide resins obtained by the reaction of an aromatic dianhydride such as pyromellitic dianhydride with an aromatic diamine such as 4,4'-oxydianiline, and the like, and blends thereof; polyamideimide resins obtained by the reaction of an aromatic anhydride acid chloride such as trimellitic anhydride acid chloride with an aliphatic diamine such as 1,4-cyclohexanediamine, and the like, and blends thereof; polyetheretherketone resins obtained by the reaction of an dihaloaromatic ketone such as bis(4-chlorophenyl) ketone with an aromatic diol such as hydroquinone, and the like, and blends thereof; polyetherketoneketone resins obtained by the reaction of an diaromatic ether such as diphenyl ether with an aromatic diacid chloride such as terephthaloyl chloride, and the like, and blends thereof; and liquid crystal polymer resins such as those as described in U.S. Pat. No. 6,492,463, and the like, and blends thereof.

Additives for the polymer composition may be selected from viscosity modifiers, catalysts, initiators, antioxidant such as a hindered phenol., blowing agent, ultraviolet light stabilizers such as hindered amine light stabilizers, UV light absorbers, heat stabilizers selected from phosphites and phenolics, lubricants, interfacial agents, organic pigments including tinctorial pigments, plasticizers, antiblocking agents selected from clay, talc, calcium carbonate, silica and silicone oil, leveling agents, flame retardants, smoke depressants, cross-linking agents, anti-cratering additives, fillers, and processing aids.

Treated pigments of the disclosure may be used to fill polymers, and in particular thermoplastics, in any of the customary ways such as, for example, extrusion applications including, for example, cast film extrusion, blown film extrusion, slit film extrusion, sheet and profile extrusion, fiber and filament extrusion, and wire coating extrusion; and molded article applications including, for example, injection molding, blow molding, and rotational molding.

For convenience, in some circumstances, the inorganic pigment and the organic compound can be mixed separately or together into a plastic melt and extruded to form a plastic part having easy cleanability, the organic compound comprising the fluoroalkyl group and the hydrocarbon group, the organic compound having the structure:

$R_H$-L-$R_F$ wherein $R_F$ is a fluorochemical component containing at least one Zerewitinoff hydrogen;

$R_H$ is selected from the group of an aliphatic group of 1-30 carbons, cycloaliphatic group of 3-30 carbons, an aromatic group of 6-30 carbons, and a group having the structure: R'—(OCH$_2$CHR")$_{x'}$—(OCH$_2$CH$_2$)$_{y'}$—O—, wherein R' is H or an aliphatic group of 1-20 carbons, R" is H or methyl; and x' and y' are the same or different integers ranging from 0-20 except that the sum of x' and y' is at least 1 when R' is H, and mixtures thereof, preferably x' is 0 and y ranges from 3 to 1; and L is selected from the group CO, isocyanate, and a mixture of polyisocyanates containing at least three isocyanate groups per molecule. In this case, the inorganic pigment is optionally treated with the particular organic compound comprising the fluoroalkyl group and the hydrocarbon group of this disclosure. The inorganic pigment may have other treatment disclosed herein, for example, the pigment may be silanized or treated with polydimethyl siloxane.

There are numerous well-known techniques for preparing the plastic compositions of the disclosure.

A plastic concentrate may first be prepared having a high concentration of the pigment, commonly referred to as masterbatch, and the subsequently combining the concentrate with a resin. The highly loaded concentrates, typically polymer concentrates, are made as described above with the weight percent of treated pigment, typically treated titanium dioxide, for the intended end use. For example, in polyolefin concentrates, about 50 wt. % to about 85 wt. % concentrate may be used usually to opacify the composition. Let down refers to the process of lowering the pigment concentration in a resultant polymer.

In cast film extrusion, useful thermoplastics include, for example, polyethylenes, polypropylenes, polyesters, polyvinyl chlorides, styrenes, polyamides, and polycarbonates.

In blown film extrusion, useful thermoplastics include, for example, polyethylenes and polypropylenes.

In slit film extrusion, useful thermoplastics include, for example, polypropylenes.

In sheet and profile extrusion, useful thermoplastics include, for example, polyethylenes, polypropylenes, polyesters, polyvinyl chlorides, styrenes, fluoropolymers, polyamides, polycarbonates, elastomeric polymers, polyimides, polyetherimides, polyamideimides, polyetheretherketones, polyetherketoneketones, polyphenylene sulfides, and polyacetals.

In fiber and filament extrusion, useful thermoplastics include, for example, polypropylenes, polyesters, polyamides, and polyurethaneureas and elastomeric polymers.

In wire coating extrusion, useful thermoplastics include, for example, polyethylenes, polyvinyl chlorides, and fluoropolymers, polyimides, polyetherimides, and elastomeric polymers.

In injection molding, useful thermoplastics include, for example, polyethylenes, polypropylenes, polyesters, polyvinyl chlorides, styrenes, polyamides, polycarbonates, urethanes, acetals, polyphenylene sulfides, elastomeric polymers, polyimides, polyetherimides, polyamideimides, polyetheretherketones, and liquid crystalline polymers.

In blow molding, useful thermoplastics include, for example, polyethylenes, polypropylenes, polyesters, polyvinyl chlorides, polyamides, and polycarbonates.

In rotational molding, useful thermoplastics include, for example, polyethylenes and polypropylenes.

All of the compositions and methods disclosed and claimed herein can be made and executed without undue experimentation in light of the present disclosure. While the compositions and methods of this disclosure have been described in terms of typical embodiments, it will be apparent to those of skill in the art that variations may be applied to the compositions and methods and in the steps or in the sequence of steps of the method described herein without departing from the concept, spirit, and scope of the disclosure.

This disclosure is particularly suitable for producing shaped articles such as tubing, pipes, wire coatings, and films. The disclosure is especially useful for producing films, especially blown films. Rigid shaped articles, especially rigid vinyl and polyethylene articles are specifically contemplated, such as PVC siding, PVC window profiles and molded polyethylene toys. Products made in accordance with the disclosure have properties which allow easy removal of markings particularly markings made by waxy materials such as crayons.

In one embodiment, the invention herein can be construed as excluding any element or process step that does not materially affect the basic and novel characteristics of the composition or process. Additionally, the invention can be construed as excluding any element or process step not specified herein.

In the following Examples all parts, percentages and proportions are by weight unless otherwise indicated.

EXAMPLES

Example 1

Treated titanium dioxide is prepared using the following procedure: Into a 4 quart V-Cone blender (Patterson-Kelley, East Stroudsburg, Pa.) fitted with an intensifier bar was placed 1 kg of R-105, (E.I. du Pont de Nemours and Company, Wilmington, Del.) a titanium dioxide pigment containing silica and alumina and having a polydimethylsiloxane surface treatment and 3 gms. of finely divided a mixed perfluoroalkylethyl ester of stearic acid (available from E.I. du Pont de Nemours and Company, Wilmington, Del. as Zonyl® FTS). The contents were mixed with the intensifier bar on for 10 minutes at ambient conditions, discharged, and stored for future use.

The polyvinyl chloride sheet was prepared using the following procedure:

Into 153 grams of a plasticized polyvinyl chloride pigment, which consists of 60% PVC resin of 10 micron size, plasticized with di(2-ethylhexyl)phthalate, and containing Carbon black was placed 5 grams of treated titanium dioxide. The mixture was compounded on a two roll mill with a 25 mil gap operating at 305° F. (151.6° C.). After 2 minutes compounding, the grey sheet was removed and cooled.

The grey sheet formed was soiled with a black wax crayon (Crayola Easton Pa.) at moderate hand pressure to leave a 2.54 cm. wide mark. The test specimen was attached to a paint scrubbing machine (Byk-Gardner) fitted with a scrub boat and a piece of folded cheesecloth. To the cheesecloth was applied 25 ml (63.5 microns) of a 50/50 vol % solution of a commercial wall cleaner (Fantastik® All Purpose cleaner, manufactured by S. C. Johnson and Sons, Inc., Racine, Wis.) and the test specimen was scrubbed until the black wax crayon mark was removed. This occurred after 8 cycles of scrubbing.

Comparative Example 1

Example 1 was repeated with the following exception: the titanium dioxide was not coated with a perfluoroethyl ester of stearic acid. After 8 scrubs, the scrub machine was stopped and the sample was visually inspected. There was still a significant amount of crayon on the test sample. The scrub machine was started again and scrubbed until the sample was clean. After an additional 10 strokes, the sample was removed and judged to be clean.

Example 2

Example 1 was repeated with the following exception: 3 gms of a self-dispersing fluorinated polyurethane Zonyl® 8867L (available from E.I. du Pont de Nemours and Company, Wilmington, Del.) diluted into 3 gms. of water as a solvent to facilitate treatment were sprayed onto the R105 in the treated titanium dioxide preparation procedure.

The results show that cleaning was accomplished after 10 cycles of scrubbing.

Example 3

Example 1 was repeated with the following exception: Example 1 was repeated with the following exception: 3 gms. of aqueous fluorochemical polyurethane dispersion sold under the trade name TLF-5180 (available from E.I. du Pont de Nemours and Company, Wilmington, Del.) diluted into 3 gms of water were sprayed onto the R105 in the treated titanium dioxide preparation procedure.

The results show that cleaning was accomplished after 11 cycles of scrubbing.

Example 4

A treated titanium dioxide/PVC mixture is prepared using the following procedure:

Into a 4 quart V-Cone blender (Patterson-Kelley, East Stroudsburg, Pa.) fitted with an intensifier bar was placed 940 gms of a finely divided polyvinyl chloride resin (Geon E6950-nat supplied by Polyone Avon Lake Ohio), 50 gm of R-105, titanium dioxide (available from E.I. du Pont de Nemours and Company, Wilmington, Del.) and 10 gms Zonyl® 8867L (available from E.I. du Pont de Nemours and Company, Wilmington, Del.). The contents were mixed with the intensifier bar on for 10 minutes at ambient conditions, discharged, and stored for future use.

The afore mentioned pigment was melt extruded with a Haake twin screw Rheometer (Haake, Saddle Brook, N.J.) through a 4 inch by 0.060 inch die driven by a Brabender Plasti-Corder (C. W. Brabender, Hackensack, N.J.). The extrusion temperature was 190° C. The sheets were cut and soiled with a blue crayon (Crayola, Easton, Pa.) and washed on a Gardner scrub Machine filled with cheesecloth (Byk-Gardner, Columbia, Md.). The panels were scrubbed with 20 ml of Fantastic (S. C. Johnson, Racine, Wis.) until clean and the number of strokes recorded. The sample with the Zonyl came clean in 16 cycles Comparative Example 4

The procedure described in example 4 was repeated except for the omission of Zonyl® 8867L. The panel took 40 cycles to become clean.

The description of illustrative and preferred embodiments is not intended to limit the scope of the invention. Various modifications, alternative constructions and equivalents may be employed without departing from the true spirit and scope of the appended claims.

What is claimed is:

1. A treated pigment comprising:
   (a) an inorganic pigment having a surface;
   (b) an organic compound comprising a fluoroalkyl group and a hydrocarbon group and having the structure:

$R_H$-L-$R_F$ wherein
   $R_F$ is a fluorochemical component containing at least one Zerewitinoff hydrogen;
   $R_H$ is selected from an aliphatic group of 1-30 carbons, cycloaliphatic group of 3-30 carbons, an aromatic group of 6-30 carbons, and a group having the structure: R'—(OCH$_2$CHR")$_{x'}$,—(OCH$_2$CH$_2$)$_{y'}$—O—, wherein R' is H or an aliphatic group of 1-20 carbons, R" is H or methyl; and x' and y' are the same or different integers ranging from 0-20 except that the sum of x' and y' is at least 1 when R' is H, and mixtures thereof; and L is selected from the group CO, isocyanate, and a mixture of polyisocyanates comprising at least three isocyanate groups, the treated pigment having the organic compound as a treatment on the surface of the pigment.

2. The treated pigment of claim 1 wherein the inorganic pigment is selected from an oxide, hydroxide, sulfide, carbonate, or sulfate of Ca, Mg, Ti, Ba, Zn, Mo, Si, or Al and mixtures of any of the foregoing.

3. The treated pigment of claim 1 wherein the inorganic pigment is titanium dioxide.

4. The treated pigment of claim 2 wherein the inorganic pigment comprises a surface treatment of a pyrogenically-deposited oxide selected from silica, alumina, zirconia, phosphoria, boria, and mixtures thereof.

5. The treated pigment of claim 1 wherein $R_F$ is a fluorochemical of the structure:

wherein
$R_f$ is a monovalent aliphatic group containing at least two carbon atoms each of which is bonded to at least two fluorine atoms;
R is a divalent organic radical;
k is 0 or 1; and
$X_a$ is —O—, —S—, or —N($R_1$)— in which $R_1$ is H, an alkyl group containing 1 to 6 carbon atoms or an $R_f$—$R_k$- group.

6. The treated pigment of claim 1 wherein in $R_F$, R is a divalent radical selected from the group of —$C_mH_{2m}$ SO—, —$C_mH_{2m}$ SO$_2$—, —SO$_2$N($R_3$)—, and —CON($R_3$) wherein m is 1 to 22, and $R_3$ is H or a divalent alkyl group of 1 to 6 carbon atoms.

7. The treated pigment of claim 5 wherein the fluorochemical component contains a single functional group represented by the formula $R_f$—$R_{ak}$—$R_2$—$X_b$—H
wherein $R_f$ is a monovalent aliphatic group containing at least two carbon atoms each of which is bonded to a fluorine atom, $R_a$ is a divalent radical of the formula —$C_mH_{2m}$ SO—, —$C_mH_{2m}$ SO$_2$—, SO$_2$N($R_3$)— or —CON($R_3$)— in which m is 1 to 22 and $R_3$ is H or a divalent alkyl group of 1 to 6 carbon atoms, $R_2$ is a divalent linear hydrocarbon radical of the formula —$C_nH_{2n}$— which is optionally end-capped with

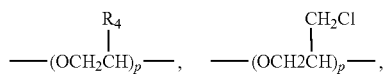

or either of the following two units:

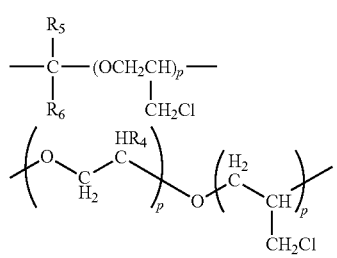

-continued

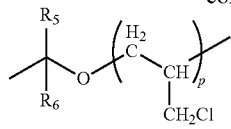

wherein n is an integer ranging from 1 to 12,
p is an integer ranging from 1 to 50;
$R_4$, $R_5$ and $R_6$ are the same or different and are H or an alkyl group containing 1 to 6 carbon atoms; and
$X_b$, is O, S or N($R_7$) in which $R_7$ is H, an alkyl group containing 1 to 6 carbon atoms, or a group having the structure $R_f$—$R_k$—$R_2$.

8. The treated pigment of claim 1 wherein in $R_F$ is represented by:

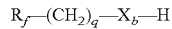

wherein
$R_f$ is a monovalent aliphatic group containing at least two carbon atoms each of which is bonded to at least two fluorine atoms;
$X_b$, is O, S, or N($R_{d7}$) in which $R_{d7}$ is H, an alkyl group containing 1 to 6 carbon atoms or an $R_{bf}$—$R_k$—$R_2$— group, wherein $R_{b\ f}$ is a mixture of perfluoroalkyl groups, CF$_3$CF$_2$(CF$_2$)$_r$ in which r is 2 to 18; and R is a divalent organic radical; and k is 0 or 1; q is 1, 2 or 3; and $R_2$ is a divalent linear hydrocarbon radical of the formula —$C_nH_{2n}$— which is optionally end-capped with

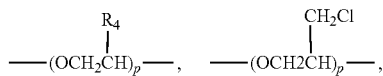

or either of the following two units:

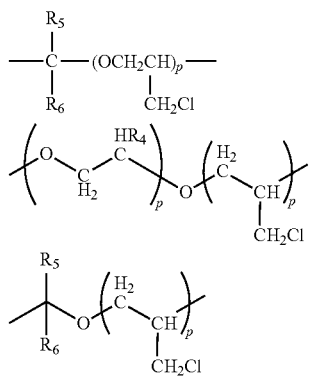

in which n is an integer ranging from 1 to 12, p is an integer ranging from 1 to 50.

9. The treated pigment of claim 5 wherein the R comprises an aliphatic hydrocarbon of 1-30 carbons, L is CO and $R_F$ is $Cn_CF_{(2n_c+1)}CH_2CH_2$—O—, wherein $n_c$ is an integer ranging from 2 to 18.

10. The treated pigment of claim 1 wherein the organic compound comprises a reaction product of:
(a) at least one diisocyanate, polyisocyanate or a mixture of polyisocyanates comprising at least three isocyanate groups per molecule;

(b) at least one fluorochemical compound comprising at least one Zerewitinoff hydrogen in an amount sufficient to react with about 5% to about 80% of the isocyanate groups in the diisocyanate or polyisocyanate;

(c) at least one compound of the formula $R_{10}$—$(R_2)_k$—YH present in an amount sufficient to react with about 5% to about 80% of the isocyanate groups in the diisocyanate or polyisocyanate, and wherein $R_{10}$ is a $C_1$-$C_{18}$ alkyl, $C_1$-$C_{18}$ omega-alkenyl radical, or $C_1$-$C_{18}$ omega-alkenoyl; $R_2$ is —$C_nH_{2n}$— optionally end-capped with —[OCH$_2$C(R$_4$)H]$_p$—, —[OCH$_2$C(CH$_2$Cl)H]$_p$—, or —C(R$_5$)(R$_6$)(OCH$_2$C[CH$_2$Cl]H)$_p$—, wherein $R_4$, $R_5$, and $R_6$ are the same or different and are H or a $C_1$-$C_6$ alkyl radical, n is an integer ranging from 1 to 12, p is an integer ranging from 1 to 50; Y is O, S, or N($R_{a7}$) wherein $R_{a7}$ is H or $C_1$-$C_6$ alkyl; and k is 0 or 1; and optionally (d) water in an amount sufficient to react with about 5% to about 60% of the diisocyanate groups in the diisocyanate or polyisocyanate.

11. The treated pigment of claim 10 wherein the organic compound is the reaction product of an isocyante or a polyisocyanate, three moles of a fluoroalkylethyl alcohol of the structure CF$_3$CF$_2$ (CF$_2$—CF$_2$)n$_a$—CH$_2$CH$_2$—O, wherein n$_a$=0-8, and citric acid.

12. The treated pigment of claim 1 wherein the organic compound is present in the amount of about 0.1 to about 10 weight %, based on the total amount of the treated pigment.

13. The treated pigment of claim 1 wherein the pigment is additionally treated with a material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, and mixtures thereof.

14. The treated pigment of claim 1 wherein the pigment is titanium dioxide treated with a silane or a polydimethylsiloxane or mixture thereof.

15. A plastic article comprising a polymer and a treated pigment, wherein the treated pigment comprises:
(a) an inorganic pigment having a surface; and
(b) an organic compound comprising a fluoroalkyl group and a hydrocarbon group and having the structure:

$R_H$-L-$R_F$ wherein
$R_F$ is a fluorochemical component containing at least one Zerewitinoff hydrogen;
$R_H$ is selected from an aliphatic group of 1-30 carbons, cycloaliphatic group of 3-30 carbons, an aromatic group of 6-30 carbons, and a group having the structure: R'—(OCH$_2$CHR")$_{x'}$—(OCH$_2$CH$_2$)$_{y'}$—O—, wherein R' is H or an aliphatic group of 1-20 carbons, R" is H or methyl; and x' and y' are the same or different integers ranging from 0-20 except that the sum of x' and y' is at least 1 when R' is H, and mixtures thereof; and
L is selected from the group CO, isocyanate, and a mixture of polyisocyanates comprising at least three isocyanate groups, the treated pigment having the organic compound as a treatment on the surface of the pigment.

16. The plastic article of claim 15 wherein the inorganic pigment is selected from an oxide, hydroxide, sulfide, carbonate, or sulfate of Ca, Mg, Ti, Ba, Zn, Mo, Si, or Al and mixtures of any of the foregoing.

17. The plastic article of claim 15 wherein the inorganic pigment is titanium dioxide.

18. The plastic article of claim 16 wherein the inorganic pigment comprises a surface treatment of a pyrogenically-deposited oxide selected from silica, alumina, zirconia, phosphoria, boria, and mixtures thereof.

19. The plastic article of claim 15 wherein $R_F$ is a fluorochemical of the structure:

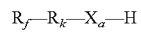

wherein
$R_f$ is a monovalent aliphatic group containing at least two carbon atoms each of which is bonded to at least two fluorine atoms;
R is a divalent organic radical;
k is 0 or 1; and
$X_a$ is —O—, —S—, or —N($R_1$)— in which $R_1$ is H, an alkyl group containing I to 6 carbon atoms or an $R_f$—$R_k$— group.

20. The plastic article of claim 15 wherein in $R_F$, R is a divalent radical selected from the group of —$C_mH_{2m}$ SO—, —$C_mH_{2m}$ SO$_2$—, —SO$_2$N($R_3$)—, and —CON($R_3$) wherein m is 1 to 22, and $R_3$ is H or a divalent alkyl group of 1 to 6 carbon atoms.

21. The plastic article of claim 19 wherein the fluorochemical component contains a single functional group represented by the formula:

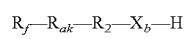

wherein $R_f$ is a monovalent aliphatic group containing at least two carbon atoms each of which is bonded to a fluorine atom, $R_a$ is a divalent radical of the formula —$C_mH_{2m}$ SO—, $C_mH_{2m}$ SO$_2$—, SO$_2$N($R_3$)— or —CON($R_3$)— in which m is 1 to 22 and $R_3$ is H or a divalent alkyl group of 1 to 6 carbon atoms, $R_2$ is a divalent linear hydrocarbon radical of the formula —$C_nH_{2n}$— which is optionally end-capped with

or either of the following two units:

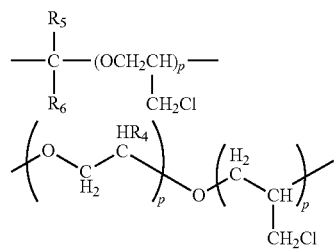

-continued

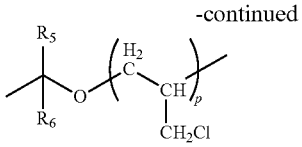

wherein n is an integer ranging from 1 to 12,
p is 1 to 50;
$R_4$, $R_5$ and $R_6$ are the same or different and are H or an alkyl group containing 1 to 6 carbon atoms; and
$X_b$, is O, S or $N(R_7)$ in which $R_7$ is H, an alkyl group containing 1 to 6 carbon atoms, or a group having the structure $R_f$—$R_k$—$R_2$.

22. The plastic article of claim 15 wherein $R_F$ is represented by the structure:

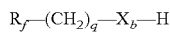

wherein
$R_f$ is a monovalent aliphatic group containing at least two carbon atoms each of which is bonded to at least two fluorine atoms;
$X_b$, is O, S, or $N(R_{d7})$ in which $R_{d7}$ is H, an alkyl group containing l to 6 carbon atoms or an $R_{bf}$—$R_k$—$R_2$— group, wherein $R_{bf}$ is a mixture of perfluoroalkyl groups, $CF_3CF_2(CF_2)_r$ in which r is 2 to 18; and R is a divalent organic radical; and k is 0 or 1; q is 1, 2 or 3; and $R_2$ is a divalent linear hydrocarbon radical of the formula —$C_nH_{2n}$— which is optionally end-capped with

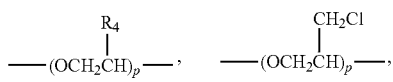

or either of the following two units:

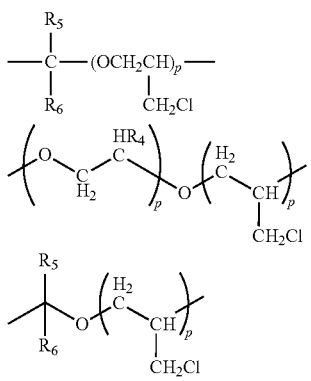

in which n is an integer ranging from 1 to 12, p is an integer ranging from 1 to 50.

23. The plastic article of claim 19 wherein the R comprises an aliphatic hydrocarbon of 1-30 carbons, L is CO and $R_F$ is $C_{n_c}F_{(2n_c+1)}CH_2CH_2$—O—, wherein $n_c$ is an integer ranging from 2 to 18.

24. The plastic article of claim 15 wherein the organic compound comprises a reaction product of:
(a) at least one diisocyanate, polyisocyanate or a mixture of polyisocyanates comprising at least three isocyanate groups per molecule;
(b) at least one fluorochemical compound comprising at least one Zerewitinoff hydrogen in an amount sufficient to react with about 5% to about 80% of the isocyanate groups in the diisocyanate or polyisocyanate;
(c) at least one compound of the formula $R_{10}$—$(R_2)_k$—YH present in an amount sufficient to react with about 5% to about 80% of the isocyanate groups in the diisocyanate or polyisocyanate, and wherein $R_{10}$ is a $C_1$-$C_{18}$ alkyl, $C_1$-$C_{18}$ omega-alkenyl radical, or $C_1$-$C_{18}$ omega-alkenoyl; $R_2$ is —$C_nH_{2n}$— optionally end-capped with —[$OCH_2C(R_4)H$]$_p$—, —[$OCH_2C(CH_2Cl)H$]$_p$—, or —C($R_5$)($R_6$)($OCH_2C[CH_2Cl]H$)$_p$—, wherein $R_4$, $R_5$, and $R_6$ are
the same or different and are H or a $C_1$-$C_6$ alkyl radical, n is an integer ranging from 1 to 12, p is an integer ranging from 1 to 50; Y is O, S, or $N(R_{a7})$ wherein $R_{a7}$ is H or $C_1$-$C_6$ alkyl; and k is 0 or 1; and optionally
(d) water in an amount sufficient to react with about 5% to about 60% of the diisocyanate groups in the diisocyanate or polyisocyanate.

25. The plastic article of claim 24 wherein the organic compound is the reaction product of an isocyante or a polyisocyanate, three moles of a fluoroalkylethyl alcohol of the structure $CF_3CF_2$ $(CF_2$—$CF_2)n_a$—$CH_2CH_2$—O, wherein $n_a$=0-8, and citric acid.

26. The plastic article of claim 15 wherein the pigment is additionally treated with an organo-silane or an organo-siloxane.

27. The plastic article of claim 15 wherein the polymer comprises a thermoplastic resin selected from a polyolefin resin, an acrylic resin, a polyester resin, a polyamide resin, an epoxy resin, a phenolic resin, a poly(vinylaromatic) resin, a poly(vinylhalide) resin, a polycarbonate resin, a fluoropolymer resin, a elastomeric polymer resin, a polyurethaneurea resin, a polyurethane resin, a polyacetal resin, a polyimide resin, a polyetherimide resin, a polyamideimide resin, a polyetheretherketone resin, a polyetherketoneketone resin, a liquid crystal polymer resin, and a blend thereof.

28. The plastic article of claim 15 wherein the thermoplastic resin is a poly(vinylchloride) resin.

29. An extruded plastic part having easy cleanability comprising an inorganic pigment having a surface and an organic compound comprising a fluoroalkyl group and a hydrocarbon group, the organic compound having the structure:

$R_H$-L-$R_F$ wherein
$R_F$ is a fluorochemical component containing at least one Zerewitinoff hydrogen;
$R_H$ is selected from an aliphatic group of 1-30 carbons, cycloaliphatic group of 3-30 carbons, an aromatic group of 6-30 carbons, and a group having the structure: R'—($OCH_2CHR''$)$_x$—($OCH_2CH_2$)$_y$—O—, wherein R' is H or an aliphatic group of 1-20 carbons, R" is H or methyl; and x' and y' are the same or different integers ranging from 0-20 except that the sum of x' and y' is at least 1 when R' is H, and mixtures thereof; and
L is selected from the group CO, isocyanate, and a mixture of polyisocyanates comprising at least three isocyanate groups, the treated pigment having the organic compound as a treatment on the surface of the pigment.

* * * * *